United States Patent
Pelletier et al.

(10) Patent No.: US 8,997,496 B2
(45) Date of Patent: Apr. 7, 2015

(54) HYBRID EXHAUST COMPONENT

(75) Inventors: Gerard D. Pelletier, Canoga Park, CA (US); Charles P. Logan, Canoga Park, CA (US); Bryan William McEnerney, Canoga Park, CA (US); Jeffrey D. Haynes, Stuart, FL (US)

(73) Assignee: United Technologies Corporation, Hartford, CT (US)

( * ) Notice: Subject to any disclaimer, the term of this patent is extended or adjusted under 35 U.S.C. 154(b) by 952 days.

(21) Appl. No.: 13/172,411

(22) Filed: Jun. 29, 2011

(65) Prior Publication Data

US 2013/0001321 A1    Jan. 3, 2013

(51) Int. Cl.
*F02K 1/04*    (2006.01)
*B64D 33/04*   (2006.01)
*F02K 9/97*    (2006.01)

(52) U.S. Cl.
CPC ......... *F02K 9/97* (2013.01); *F05D 2300/50212* (2013.01); *F05D 2300/603* (2013.01)

(58) Field of Classification Search
CPC ............. F02K 9/974; F02K 9/97; F02K 9/62; F02K 9/976; F02K 1/80; F02K 1/48; F05D 2300/603; F05D 2300/50212
USPC ........................... 60/770, 771, 799, 796, 800; 239/265.11–265.43
See application file for complete search history.

(56) References Cited

U.S. PATENT DOCUMENTS

| | | | | |
|---|---|---|---|---|
| 3,250,070 | A * | 5/1966 | Milewski et al. | 60/770 |
| 4,180,211 | A * | 12/1979 | Olcott et al. | 239/265.43 |
| 4,907,743 | A * | 3/1990 | Bouiller et al. | 239/265.11 |
| 5,594,216 | A * | 1/1997 | Yasukawa et al. | 181/213 |
| 5,759,688 | A | 6/1998 | Lee et al. | |
| 5,894,723 | A * | 4/1999 | Gastal | 60/770 |
| 6,209,312 | B1 * | 4/2001 | Singer et al. | 60/770 |
| 7,458,617 | B2 * | 12/2008 | Leslie et al. | 285/390 |
| 7,926,285 | B2 * | 4/2011 | Tisdale et al. | 60/770 |
| 7,980,057 | B2 * | 7/2011 | Facciano et al. | 60/200.1 |
| 2009/0068004 | A1 | 3/2009 | Benoit et al. | |
| 2009/0084899 | A1 * | 4/2009 | Kismarton et al. | 244/123.1 |
| 2009/0266870 | A1 | 10/2009 | Yousefiani et al. | |
| 2009/0269497 | A1 | 10/2009 | Yousefiani et al. | |
| 2010/0193605 | A1 * | 8/2010 | Johnson et al. | 239/265.11 |
| 2010/0251721 | A1 | 10/2010 | Morrison et al. | |

* cited by examiner

*Primary Examiner* — Phutthiwat Wongwian
*Assistant Examiner* — Steven Sutherland
(74) *Attorney, Agent, or Firm* — Carlson, Gaskey & Olds, P.C.

(57) ABSTRACT

An exhaust includes a wall that has a first composite material having a first coefficient of thermal expansion and a second composite material having a second coefficient of the thermal expansion that is less than the first coefficient of thermal expansion.

18 Claims, 2 Drawing Sheets

HYBRID EXHAUST COMPONENT

STATEMENT REGARDING FEDERALLY SPONSORED RESEARCH OR DEVELOPMENT

This invention was made with government support under contract number NNM06AB13C awarded by NASA. The government has certain rights in the invention.

BACKGROUND

This disclosure relates to rocket engine exhaust components. A rocket engine typically includes a nozzle to expand and accelerate combustion gases from the burning of the propellant(s) in the rocket. The nozzle may include a nozzle extension secured at one end as an exhaust to expel the combustion gases and provide a desired nozzle area ratio. Depending on the engine cycle, the joint between the nozzle and the extension is exposed to extreme hot or cold temperatures.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
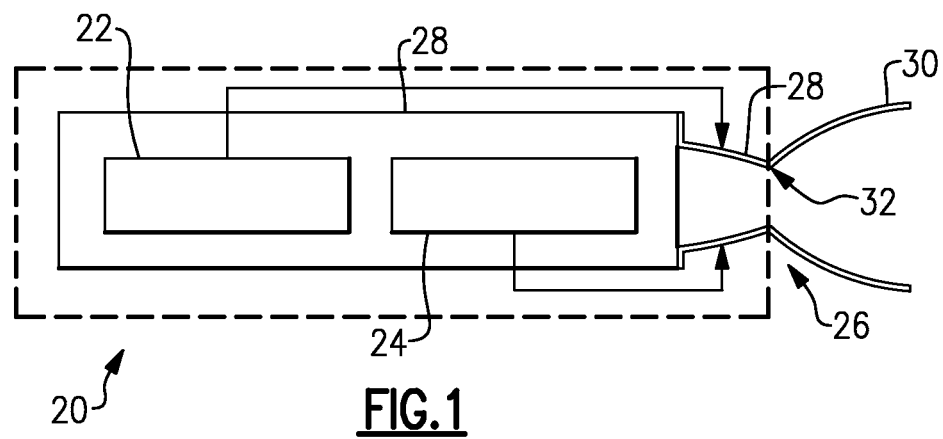
FIG. 1 schematically shows an example rocket system.

FIG. 1 schematically illustrates an example rocket system 20, in a highly schematic and simplified view, to describe the general location and use of a rocket exhaust. In the illustrated example, the rocket system 20 is a liquid rocket design. It is to be understood, however, that other rocket designs will also benefit from the examples disclosed herein.

In the illustrated example, the rocket system 20 includes a fuel tank 22 and an oxidizer tank 24. The fuel tank 22 and the oxidizer tank 24 are fluidly connected with an exhaust 26 that includes a nozzle 28 and nozzle extension 30. The fuel tank 22, oxidizer tank 24 and the associated connections are considered to be a rocket engine. The nozzle extension 30 is secured to the nozzle 28 at a joint 32. The nozzle 28 in one example is made of a metal or metal alloy material. As will be described in further detail below, the nozzle extension 30 includes features that mitigate thermal expansion differences between the nozzle 28 and the nozzle extension 30. It is to be understood, however, that the examples disclosed herein are not limited to nozzle extensions and may be applied to other exhaust components, including ducts, the nozzle 28, manifolds or other fluid-containing members that are attached to a mating component where thermal expansion is a consideration.

In operation, fuel from the fuel tank 22 and oxidizer from the oxidizer tank 24 are provided to a combustion section of the nozzle 28 for reaction to obtain thrust. In that regard, a rocket or rocket system is generally regarded to be a reaction engine that achieves thrust by the combustion of one or more propellants.

Figure 2:
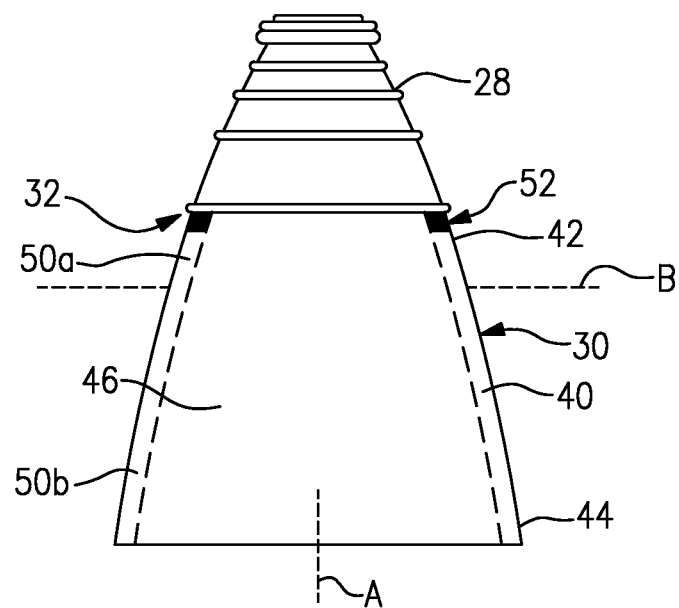
FIG. 2 shows a perspective view of an exhaust.

FIG. 2 shows selected portions of the exhaust 26, including the nozzle 28 and nozzle extension 30. As shown, the nozzle extension 30 includes a wall 40 that is solid and continuously extends between a first axial end 42 and a second axial end 44. In this example, the first axial end 42 and the second axial end 44 refer to the end portions and not necessarily to the terminal surfaces thereof. The nozzle extension 30 is attached to the nozzle 28 at the first end 42. The wall 40 extends around a central axis A to define an internal space 46. As shown, the internal space 46 diametrically increases from the first end 42 to the second end 44 such that the nozzle extension 30 is generally bell-shaped.

The wall 40 includes a first composite material 50a that has a first coefficient of thermal expansion ($CTE_1$) and a second composite material 50b that has a second coefficient of thermal expansion ($CTE_2$) that is less than the $CTE_1$. The boundary between the first composite material 50a and the second composite material 50b is generally shown by the horizontal dashed line "B" in FIG. 2. In other examples, the boundary is at a different location that is closer to the first end 42 or to the second end 44 than the location shown in this example.

The first end 42 includes an attachment feature 52 (shown schematically) for attaching the nozzle extension 30 to the nozzle 28 at the joint 32. In that regard, the coefficient of thermal expansion of the first composite material 50a is tailored to be close to the coefficient of thermal expansion ($CTE_{nozzle}$) of the nozzle 28. The coefficient of thermal expansion of the second composite material 50b is different than either of the $CTE_1$ or the $CTE_{nozzle}$ such that $CTE_{nozzle} > CTE_1 > CTE_2$.

In the illustrated example, the first composite material 50a is different from the second composite material 50b in at least one of composition, microstructure or processing. It is the difference in composition, microstructure or processing that provides the difference in coefficient of thermal expansion between the first composite material 50a and the second composite material 50b. In a further example, the first composite material 50a is of different composition than the second composite material 50b. In other words, the compositions have different chemical elements and/or include common elements, but in different amounts.

In one example, the first composite material 50a and the second composite material 50b are each fiber reinforced composite materials. In a further example, the fiber reinforced composite material of at least one of the first composite material 50a or the second composite material 50b includes a three-dimensional fiber structure. Alternatively, the fiber reinforced composite material includes a two-dimensional fiber structure, such as a stacked sheet arrangement. In another alternative, the fiber reinforced composite of one of the first composite material 50a or the second composite material 50b is three-dimensional and the fiber reinforced composite of the other is two-dimensional.

In a further example, the fibers of the first composite material 50a include silicon carbide fibers and the fibers of the second composite material 50b include graphitic carbon fibers. In a further example, the silicon carbide fibers of the first composite material 50a and the graphitic carbon fibers of the second composite material 50b are dispersed in respective graphitic carbon matrices. That is, the composite materials are carbon composites that utilize different fibers to achieve the difference in their coefficients of thermal expansion. For the example of silicon carbide fibers, the silicon carbide fibers provide the first composite material 50a with a coefficient of thermal expansion that is close to the coefficient of thermal expansion of the metal alloy of the nozzle 28. The carbon graphite fibers provide the second composite material 50b with a lower coefficient of thermal expansion that does not as closely match the coefficient of thermal expansion of the metal alloy of the nozzle 28. In one example, using the second composite material 50b allows a portion of the nozzle extension 30 to be made from a material having different characteristics than the first composite material 50a. For instance, the second composite material 50b may differ from the first composite material 50a in cost, density thermal conductivity, structural efficiency or combinations thereof.

In another example, the joint 32 is exposed to extreme low temperatures, such as cryotemperatures, and the matrices of the first and second composite materials 50a, 50b include a polymer material. In one example, the polymer material is polyimide. For instance, the first composite material 50a includes silicon carbide fibers dispersed within a polyimide matrix and the second composite material 50b includes graphitic carbon fibers dispersed within a polyimide matrix.

It is to be understood that in the disclosed examples, the wall 40 includes only the first composite material 50a and the second composite material 50b to achieve the desired coefficients of thermal expansion. Alternatively, the wall 40 includes other materials in addition to the first composite material 50a and the second composite material 50b.

Figure 3:
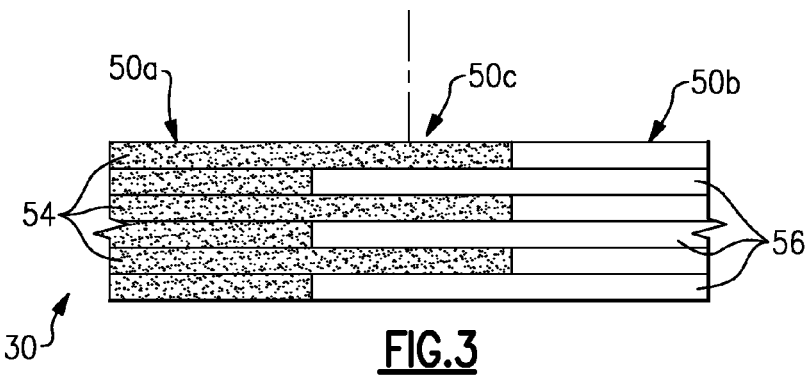
FIG. 3 shows a cross-sectional view of a nozzle extension that includes interleaved composite layers.

FIG. 3 illustrates a portion of the nozzle extension 30 in the vicinity of the boundary between the first composite material 50a and the second composite material 50b. In this example, there is an intermediate section 50c that is a transition between the first composite material 50a and the second composite material 50b. As shown, each of the first composite material 50a and the second composite material 50b includes a respective layered structure. The layered structure of the first composite material 50a includes layers 54 and the layered structure of the second composite material 50b includes layers 56 that are interleaved with alternating ones of the layers 54 of the first composite material 50a. The first composite material 50a and the second composite material 50b are secured together by the interleaving.

In a further example, the layers 54 and 56 are fiber-reinforced composite layers. Using prior fiber composition examples, the layers 54 of the first composite material 50a are unidirectionally oriented fiber layers of silicon carbide fibers and the layers 56 of the second composite material 50b are unidirectionally oriented fiber layers of graphitic carbon fibers. In a further example, the layers 54 are cross-arranged in a stack of alternating 0°/90° orientations. The layers 56 are also are cross-arranged in a stack of alternating 0°/90° orientations. In other examples, other stacking arrangements are used.

Figure 4:
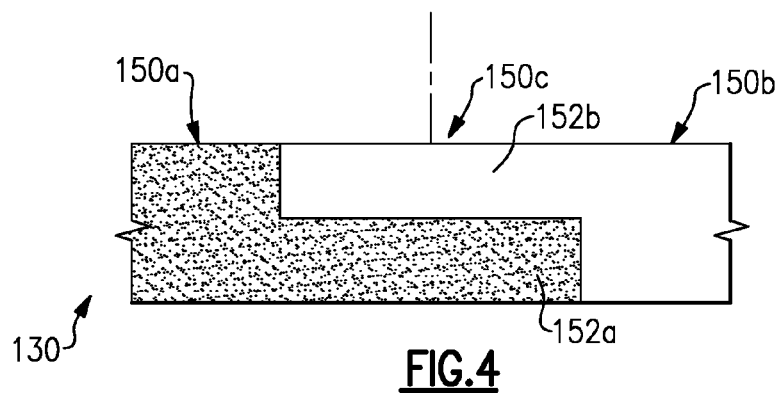
FIG. 4 shows a cross-sectional view of a nozzle extension having an axially overlapping structure.

FIG. 4 shows an example of a portion of another embodiment nozzle extension 130. In this disclosure, like reference numerals designate like elements where appropriate, and reference numerals with the addition of one-hundred or multiples thereof designate modified elements that are understood to incorporate the same features and benefits of the corresponding numbered elements. In this example, the nozzle extension 130 is similar to the nozzle extension 30 except that in the vicinity of the boundary between a first composite material 150a and a second composite material 150b there is an intermediate section 150c that forms an overlapping joint. As shown, the first composite material 150a includes a narrow elongated finger 152a and the second wall section 150b includes a corresponding narrow elongated finger 152b. The fingers 152a and 152b axially overlap to form a transition between the first composite material 150a and the second composite material 150b.

In the examples shown in FIG. 3 and FIG. 4, the respective interleave structure or overlapping structure is formed during manufacturing. In one example, the manufacturing process includes laying-up fiber layers to form each of the first composite material 50a, 150a and second composite material 50b, 150b. In the lay-up process, the fiber layers are either interleaved or overlapped to form the illustrated composite structures. In one example, the fiber layers are pre-impregnated with a precursor material for forming the selected matrix composition of the first and second materials. In other examples, the fiber layers are dry, and the matrix material or precursor material is introduced after the lay-up process using known infiltration or transfer techniques.

Alternatively, either of the first composite material 150a or second composite material 150b can be separately manufactured using a two-dimensional or three-dimensional fiber structure, and then the other of the first composite material 150a or second composite material 150b can be formed around the pre-manufactured section. That is, the pre-manufactured section is at least partially processed with regard to curing or conversion of the starting materials into the final materials. In some examples, the materials of the pre-manufactured section are fully processed and require no further treatment to achieve the final, end-use state.

Figure 5:
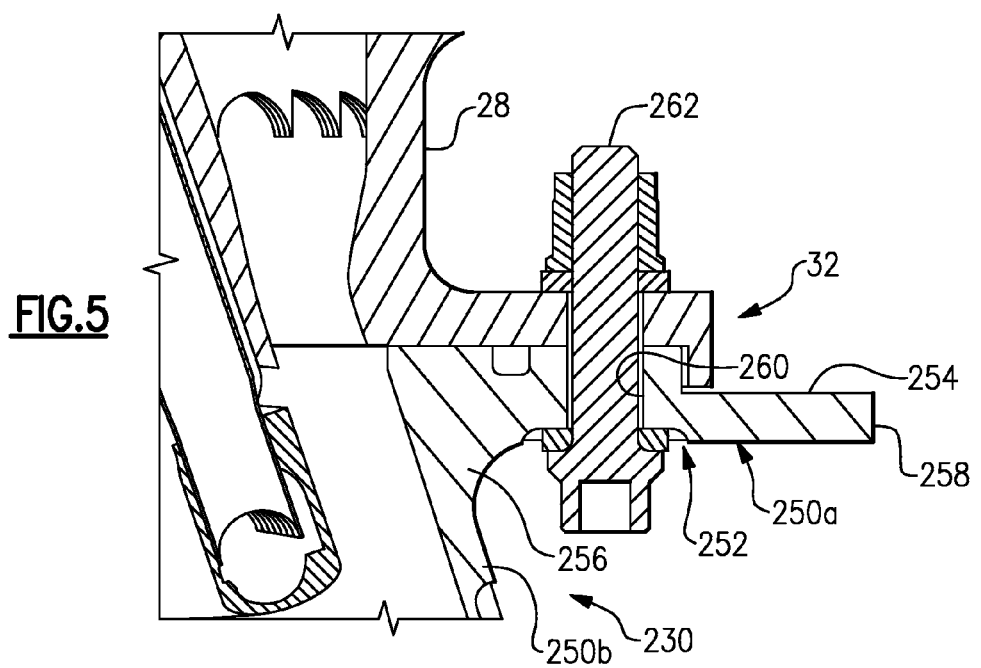
FIG. 5 shows a portion of a nozzle extension having an attachment flange.

FIG. 5 illustrates a portion of another nozzle extension 230. In this example, a first composite material 250a includes an attachment feature 252. The attachment feature 252 includes a flange 254 that extends from a base 256 to a free end 258. In this example, the flange 254 extends radially outward relative to the axis A.

As shown, the flange 254 also includes an attachment opening 260 for securing the flange 254 with the nozzle 29. A fastener 262 is received through the attachment opening 260 to secure the nozzle extension 230 and the nozzle 28 together. That is, the flange 254 is secured directly with the nozzle 28 such that the metal alloy of the nozzle 28 is in contact with the material of the first composite material 250a. As described above, the material of the first composite material 250a has a coefficient of thermal expansion that closely matches the coefficient of thermal expansion of the metal alloy of the nozzle 28. In that regard, the joint 32 formed between the nozzle 28 and the nozzle extension 230 is robust and can withstand extreme high or low temperatures. The remaining portion of the nozzle extension 230 that is formed from the second composite material 250b can be formed of a different material having different characteristics than the first composite material 250a in terms of cost, density thermal conductivity, structural efficiency or combinations thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An exhaust comprising:
a wall of a rocket engine nozzle extending from a first end to a second end and around a central axis to define an internal space, the wall including a first composite material having a first coefficient of thermal expansion and a second composite material having a second coefficient of thermal expansion that is less than the first coefficient of thermal expansion, the first composite material and the second composite material being formed of respective layered structures, with layers of the layered structure of the first composite material being interleaved in a radially alternating arrangement with layers of the second composite material.

2. The exhaust as recited in claim 1, wherein the first end comprises the first composite material and the second end comprises the second composite material.

3. The exhaust as recited in claim 1, wherein the wall includes an attachment feature.

4. The exhaust as recited in claim 1, wherein the wall includes a flange that extends radially from a base to a free end.

5. The exhaust as recited in claim 1, wherein the wall includes an attachment opening.

6. The exhaust as recited in claim 1, wherein the first composite material is different from the second composite material in at least one of composition, microstructure or processing.

7. The exhaust as recited in claim 6, wherein the second composite material is different from the first composite material in composition.

8. The exhaust as recited in claim 1, wherein the first composite material comprises silicon carbide fibers and the second composite material comprises graphitic carbon fibers.

9. The exhaust as recited in claim 1, wherein at least one of the first composite material or the second composite material includes a polymer matrix composite comprising a polyimide matrix.

10. The exhaust as recited in claim 9, wherein the polymer matrix composite comprises graphitic carbon fibers dispersed within the polyimide matrix.

11. The exhaust as recited in claim 1, wherein the first composite and the second composite each comprise a material that includes a graphitic carbon matrix, and the first composite material includes first fibers and the second composite material includes second fibers that are different from the first fibers.

12. The exhaust as recited in claim 1, wherein the layers of the respective layered structures include unidirectionally oriented fibers.

13. The exhaust as recited in claim 12, wherein the unidirectionally oriented fibers are cross-arranged in a stack of alternating 0°/90° orientations.

14. A rocket system comprising:
a rocket engine including a nozzle having a coefficient of thermal expansion ($CTE_{nozzle}$); and
a nozzle extension including a wall extending between a first end and a second end and around a central axis, the first end including a first composite material having a first coefficient of thermal expansion ($CTE_1$) and the second end including a second composite material having a second coefficient of thermal expansion ($CTE_2$) that is less than the first coefficient of thermal expansion such that $CTE_{nozzle} > CTE_1 > CTE_2$, the nozzle extension being secured at the first end to the nozzle, and the first composite material axially abutting the second composite material at an axially intermediate section of the wall, wherein the first composite material is a first fiber-reinforced polymer matrix composite and the second composite material is a second fiber-reinforced polymer matrix composite.

15. The rocket system as recited in claim 14, wherein the first composite material comprises silicon carbide fibers and the second composite material comprises graphitic carbon fibers.

16. The rocket system as recited in claim 14, wherein the wall includes an intermediate section that comprises an axial overlap of the first composite material and the second composite material.

17. The rocket system as recited in claim 14, wherein the first composite material and the second composite material are formed of respective layered structures, with layers of the layered structure of the first composite material being interleaved in a radially alternating arrangement with layers of the second composite material.

18. The rocket system as recited in claim 14, wherein a portion of the first composite material is radially stacked with a portion of the second composite material in the axially intermediate section.

* * * * *